United States Patent [19]

Ruello et al.

[11] Patent Number: 5,071,220
[45] Date of Patent: Dec. 10, 1991

[54] JOINT CLOSURE MODULE AND BOX FOR OPTICAL FIBER CABLES

[75] Inventors: Yves Ruello, Lannion; Regis Petit; Gerard Ayoul, both of Perros Guirrec, all of France

[73] Assignee: French State represented by the Minister of Post, Telecommunications and Space, Issy Les Moulineaux, France

[21] Appl. No.: 516,074

[22] Filed: Apr. 30, 1990

[30] Foreign Application Priority Data

May 11, 1989 [FR] France ................................. 89 06453

[51] Int. Cl.$^5$ ............................ G02B 6/26; G02B 6/40
[52] U.S. Cl. ....................................... 385/135; 385/53
[58] Field of Search ............... 350/96.20, 96.21, 96.22, 350/96.23

[56] References Cited

U.S. PATENT DOCUMENTS

| | | | |
|---|---|---|---|
| 4,266,853 | 5/1981 | Hutchins et al. | 350/96.20 |
| 4,319,951 | 3/1982 | Korbelak et al. | 350/96.22 X |
| 4,332,435 | 6/1982 | Post | 350/96.20 |
| 4,595,255 | 6/1986 | Bhatt et al. | 350/96.20 |
| 4,754,876 | 7/1988 | Noon et al. | 350/96.20 |
| 4,793,682 | 12/1988 | Cooper | 350/96.20 |
| 4,799,757 | 1/1989 | Goetter | 350/96.20 |
| 4,805,979 | 2/1989 | Bossard et al. | 350/96.20 |
| 4,818,054 | 4/1989 | George et al. | 350/96.20 |
| 4,838,640 | 6/1989 | Anderton | 350/96.20 |
| 4,840,449 | 6/1989 | Ghandeharizadeh | 350/96.20 |
| 4,854,661 | 8/1989 | Cooper et al. | 350/96.20 |
| 4,900,123 | 2/1990 | Barlow et al. | 350/96.20 |
| 4,927,227 | 5/1990 | Bensel, III et al. | 350/96.20 |

*Primary Examiner*—Brian Healy
*Attorney, Agent, or Firm*—Barnes & Thornburg

[57] ABSTRACT

Joint closure modules and boxes for optical fiber cables, also known as splice organizers, the module having a supporting plate demarcating a shielded space of extension of the fiber transfer sections, said supporting plate including, firstly, a set of aligned and separate means for anchoring the external sheath, the peripheral reinforcements and the central strength element, respectively, of each cable and, secondly, at least one fiber coiling and connection cartridge with guided hinging, arranged so as to limit the transfer length and the course of shift of said sections for the transfer of the guided shift of said hinged cartridge.

18 Claims, 3 Drawing Sheets

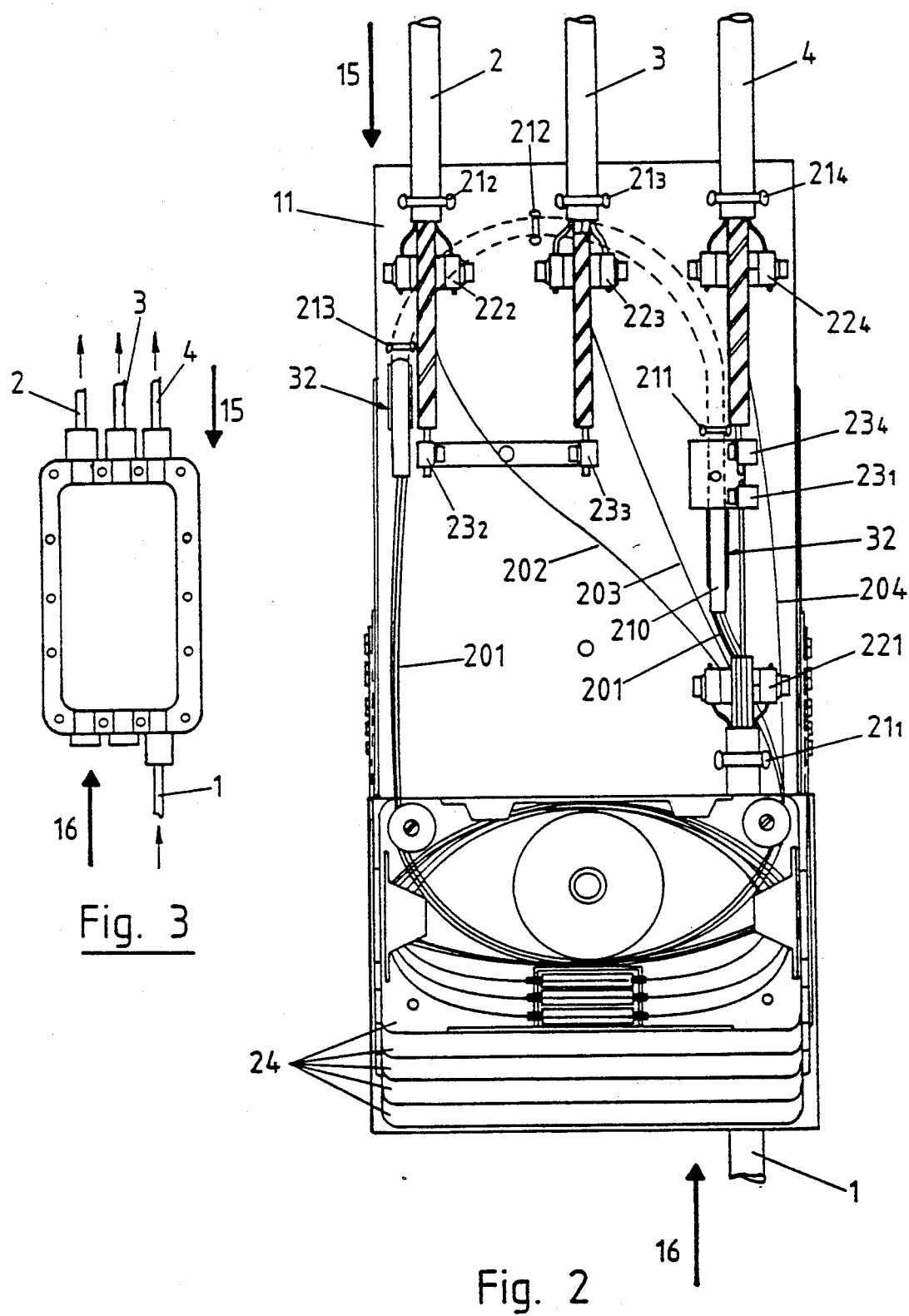

JOINT CLOSURE MODULE AND BOX FOR OPTICAL FIBER CABLES

BACKGROUND OF THE INVENTION

1. Field of the Invention

The field of the invention is that of joint closure boxes for optical cables, also known as splice organizers.

In a known way, a joint closure box for optical fiber cables has to fulfil several functions. It should:

provide for the stopping and mechanical holding of the constituent elements of the joined or connected optical fiber cables, notably the central strength element, the grooved core or the tube, the peripheral braid or rod reinforcements as well as the external sealing sheath;

provide for the stable and shielded housing of the fiber joints or connections as well as the reserve lengths of optical fibers on the specific supports (generally called cartridges). Reserve lengths are provided to enable subsequent cable resplicing operations. The housing function should naturally meet the constraints that ensure the efficient working of the fibers, notably the constraints of imperviousness to weather vagaries and of minimal radius of curvature of the fiber windings;

enable the fastening and stable holding of the supports and cartridges;

provide a space for storing fiber transfer sections extending between the cable ends, on the one hand, and the supports or cartridges, on the other hand, within a shielded volume;

enable the handling of the connections or joints and the fibers, during the first assembly as well as during subsequent reservicing operations, in doing so without hampering the working of the neighboring links.

2. Description of the Prior Art

There already exist known joint closure boxes fulfilling at least some of these functions to varying degrees.

These known devices can be classified according to the type of cable to which they apply. For, a distinction is made between two types of optical fiber cables, depending on whether the fibers are maintained around the central strength element of the cable by a grooved core (with helical or alternating pitch), or by guiding tubes.

In the field of joint closure boxes for cables with reinforcing tubes, there is a known device formed by cartridges in the form of hollowed disks receiving the connections or joints and reserve lengths of fibers at their center. These disks are stored juxtaposedly and coaxially, and can be extracted freely and separately from their stored position to provide for assembly and maintenance. This known system has the drawbacks generic to all the existing joint closure boxes. Thus, it gives no solution suited to all the types of cables, but a solution suited only to cables with tubes. No original mechanical stopping and holding structure is provided in the case of optical fibers with grooved core. Furthermore, the handling of the optical fibers makes it necessary to move aside the disk-shaped cartridges with all the risks and problems resulting therefrom for the fiber sections connected to these cartridges.

There is also a known optical fiber cable joining device including a plurality of substantially quadrangular cartridges, which can be arranged side by side in racks or, again, superimposed in the form of "drawers" as described in the European patent document 0 204 581.

Another device of this type is described in the European patent document 0 222 691. This device stores reserve lengths in a cartridge which can take two positions, a closed position and an open position, enabling access to the reserve lengths. The opening of the cartridge leads to a major shifting of the optical fiber sections, with a great variation in their radius of curvature. This second type of known device is more particularly adapted to cables with tubes.

In the case of grooved core cables, this type of device has cable-spreader parts providing, firstly, for the stopping and holding of the cable elements and, secondly, for the separation into individual units of the optical fibers which then coil within the joint closure box towards the cartridges. These spreader parts are, for example, of the type described in the French patent document No. 2 585 139 or in the European patent document No. 0 225 986. These spreader heads are complicated and expensive parts that are relatively difficult to use (the spreader head of the above-mentioned patent 2 585 139 provides for the injection of the fibers into the head by compressed fluid). Furthermore, these approaches require a shielding of the fibers by tubing between the end of the core and the entry of the coiling and splicing cartridge. The tubing operation is made obligatory to shield the fibers because the handling of the cartridges makes it necessary to push them aside to a specific working zone for the connecting or maintenance operations.

Tubing is a highly penalizing constraint in terms of the costs of undertaking servicing operations on the joint closure boxes. It must be noted that a retubing operation is also necessary in the case of cables with tubular reinforcement: the tubes used in this type of cable generally have very poor thermal stability (expansion, relaxation and shrinkage) which may notably induce strains on the fibers if the radii of curvature are small, typically smaller than about 10 cm. Furthermore, the fact of not following precise and complicated operating procedures has proved to have serious consequences for the reliability of the product.

Finally, as a general rule, known joint closure systems provide only very low accessibility during maintenance.

The invention is aimed at providing a modular joint closure box for optical fiber cables that makes it possible, notably, to overcome these various drawbacks of existing systems.

SUMMARY OF THE INVENTION

More precisely, it is a first aim of the invention to provide a joint closure module for optical fiber cables that is designed so as to restrict the transfer lengths of the fibers between the spreader zones of the cables and the cartridges for connecting and coiling the reserve lengths. The limiting of these transfer lengths and of the courses of shifting of the fiber transfer sections should be capable of ensuring great stability and reliability of the connections and should thus enable doing away with the expensive and complicated fiber tubing operation.

Another aim of the invention is to provide a module having total compatibility with every kind of existing optical fiber cable. The design of the box of the invention enables this compatibility to be obtained at an extremely low cost price as regards both the structural elements and their use.

An additional aim of the invention is to provide a joint closure module that is made simply and at little cost, has no complicated parts but, at the same time, fulfils all the other aims.

A complementary aim of the invention is to provide a joint closure module that is very easy to mount and to maintain, through the very high accessibility of the different elements and a simplicity of implementing the stages for preparing and anchoring the cables, connecting the optical fibers and resplicing said fibers if necessary.

These aims, as well as others that shall appear subsequently, are achieved by means of a joint closure module for optical fiber cables wherein each cable is notably of the type including, inserted in an external sealing sheath, a plurality of optical fibers held around a central strength element by grooved core or tube and peripheral reinforcement braid supports or rod supports, said module receiving the ends of the cables to be connected to at least one of two opposite access faces, and providing shelter to means for fastening the cable ends, means for spreading the fibers contained in the cables, and cartridges housing reserve coils of fibers and the connecting splices of said connected fibers. This module having a supporting plate demarcating, above at least one portion of its surface, a shielded space of extension of the transfer sections of the fibers, said supporting plate including, firstly, a set of aligned and separate means for anchoring the external sheath, the peripheral reinforcements and the central strengh element, respectively, of each cable and, secondly, at least one fiber connection (or joining) and coiling cartridge, with guided hinging arranged so as to restrict the transfer length and course of shift of said transfer sections during the guided shifting of said hinged cartridge.

The definition of a shielded space for the extension of the fiber transfer sections, combined with the restriction of the length of the transfer sections as well as with the control of their (reduced) course of shift by means of the guidance of the hinging of the cartridges, gives a joint closure module with high-performance characteristics of use for an extremely modest cost price. Indeed, this enables the limiting, within this space, of the shifting of the fibers which, furthermore, are without strains because of the hinged guiding of the cartridges. Moreover, the tubing of the fibers is thus made unnecessary, since the fibers are no longer subjected to the risks and hazards of shifting, as was the case during the poorly controlled movements of the cartridges in existing systems.

The joint closure module of the invention has a number of advantageous characteristics pertaining to the definition of the shielded space for extension of the transfer sections of the fibers, the design of the anchoring studs for the cable elements, the definition of an additional space for coiling the optical fibers beneath the plate and the implementation of the principle of guided hinging of the fiber coiling and connection cartridges.

As regards the demarcation of the shielded space, the supporting plate advantageously has substantially vertical lateral shielding cheek plates providing a heightwise demarcation of said shielded space for extension of the fiber transfer sections. Said cheek plates are preferably surmounted by a movable hood for closing said shielded space for extension of the fiber transfer sections. Thus, said fiber transfer sections extend essentially in a straight line in a space demarcated by the supporting plate and the shielding side cheek plates between said means for anchoring the elements of the cable, and the cartridge entries. The shielded space can also be limited to a more restricted space, as a function of the layout and shape of the hinged cartridges, especially when the module has several sets of cartridges.

As regards the anchoring studs, the module of the invention advantageously includes at least two adjacent cable entry tubings arranged in a plane parallel to the supporting plate of the module, the sets of aligned means for anchoring the cable elements to the supporting plate extending parallel to said supporting plate, substantially in the alignment of said entry tubings. Preferably, the anchoring means of the separate cables have a spacing between them such that the fibers coming from a cable received on at least one of said entry faces of the module extend directly without coiling, into said shielded space, up to the corresponding connection and reserve coiling cartridge.

Preferably, at least some of said means for anchoring the cable elements are formed by studs fixedly joined to the plate, provided with movable means for fixing said elements of the cable, by screws or other means. The anchoring stud of the central of the cable advantageously has a multiple-position and multiple-caliber part for receiving said central.

As already mentioned, the module of the invention advantageously has a space for coiling the optical fibers on that side of the surface of the supporting plate which is opposite the surface for anchoring the elements of the cables. It then preferably has perforations crossing the fibers from the anchoring face towards the coiling face of the supporting plate, said crossing perforations being prepared in such a way as to enable the coiling of the fibers on that side of the access face of the module which is opposite the face for receiving the end of the optical cable corresponding to said fibers.

It is also possible to arrange the different anchoring means on one of the surfaces of the supporting plate and the hinged cartridges on the other surface. It is also possible to provide for anchoring means and/or cartridges on both surfaces of the plate. These configurations make it possible, for example, to increase the size and/or the number of the cartridges and, hence, the capacity of the joint closure module.

Despite the prejudices of the profession in this matter, it does not prove to be necessary to tube the fibers to make them circulate from one side of the plate to the other. For, the optical fibers are brittle as regards the curvature but very strong under torsion. Such a configuration, maintaining an acceptable radius curvature with little variation during the shifts of the cartridge, can therefore be implemented while, at the same time, keeping the fiber bared on the essential part or throughout the length of the fiber transfer sections.

Finally, with respect to each cartridge for the coiling and connection or joining of the fibers, these hinging means are advantageously formed so as to enable a shifting of the cartridge between a first functional position of normal storage of the cartridge in the module and a second maintenance position, with the shifting of the cartridge between the first position and the second position taking place along a single guided course.

In a preferred characteristic, said single guided course of each cartridge essentially describes a curve of rotation, and the entries of fibers in the coiling cartridges are located on the rotation pin side of the cartridge.

Advantageously, the rotation pin of each cartridge is substantially parallel to the plane of said supporting plate, said cartridge extending in a plane substantially parallel to the supporting plate of the module in said first position of storage.

Advantageously, said supporting plate has at least one set of at least two coiling and connection cartridges, the cartridges of one and the same set extending in an essentially superimposed way, parallel to the supporting plate, in the first storage position, and being capable of being shifted towards the second maintenance position so as to clear the access to the lower cartridge of the superimposed assembly. Each set of at least two superimposed cartridges advantageously has a fixed cartridge.

Preferably, the hinging means of the cartridge are formed by at least one rocking lever fixedly joined to said cartridge, and mounted rotationally on said supporting plate, said lever cooperating with the temporary fixing means by the snapping in of the cartridge in the maintenance position.

The invention also concerns a joint closure box for optical fiber cables comprising at least one joint closure module having all or a part of the preceding characteristics, inserted between two sealing half-shells.

BRIEF DESCRIPTION OF THE DRAWINGS

Other characteristics and advantages of the invention will appear from the following description of a preferred embodiment of the optical fiber cable joint closure module, given by way of a non-restrictive illustration, and from the appended drawings, wherein:

FIG. 2 is a top view of the module of FIG. 1, shown schematically with four optical fiber cables mounted and connected in a "1 towards 3" configuration;

FIG. 3 illustrates the exemplary connection according to the "1 towards 3" configuration, by means of a joint closure box according to FIGS. 1 and 2;

DESCRIPTION OF PREFERRED EMBODIMENTS

The joint closure module of the invention is compatible with different types of existing optical fiber cables.

A first type of cable is formed by a grooved core, mounted around a central strength element. The grooved core has either helical grooves or grooves in an SZ arrangement (with alternated pitch). It is possible to count up to six fibers per groove. The material of which the grooved core is made is, for example, PVC, polyethylene or polypropylene. This type of cable also generally has a tube for holding the optical fibers in the grooves consisting, for example, of a polyethylene extruded tube or, again, a Terphane (registered trade mark) strip which may or may not be woven. The holding tube is itself generally surrounded by a peripheral reinforcement, either in the form of Kevlar (registered trade mark) fibers, if necessary lubricated and inflated by means of a CMC type hydrophilic powder, with the role of sealing the cable, or in the form of flat rods (made of glass for example) forming rigid reinforcements along the generatrices of the cable. The external sheath of the cable is advantageously made of high-density polyethylene.

A second type of cable structure has a set of flexible tubings, each enclosing up to six fibers and twisted in a helical pitch or alternated pitch around the central strength element. These tubings replace the grooved core. They are, for example, made of polyester, polypropylene or PBTP (polybutylene terephtalate). The peripheral reinforcement means, which are fibrous or in the form of rigid rods, are also used in this type of cable, in the same way as for grooved core cables.

Figure 1:
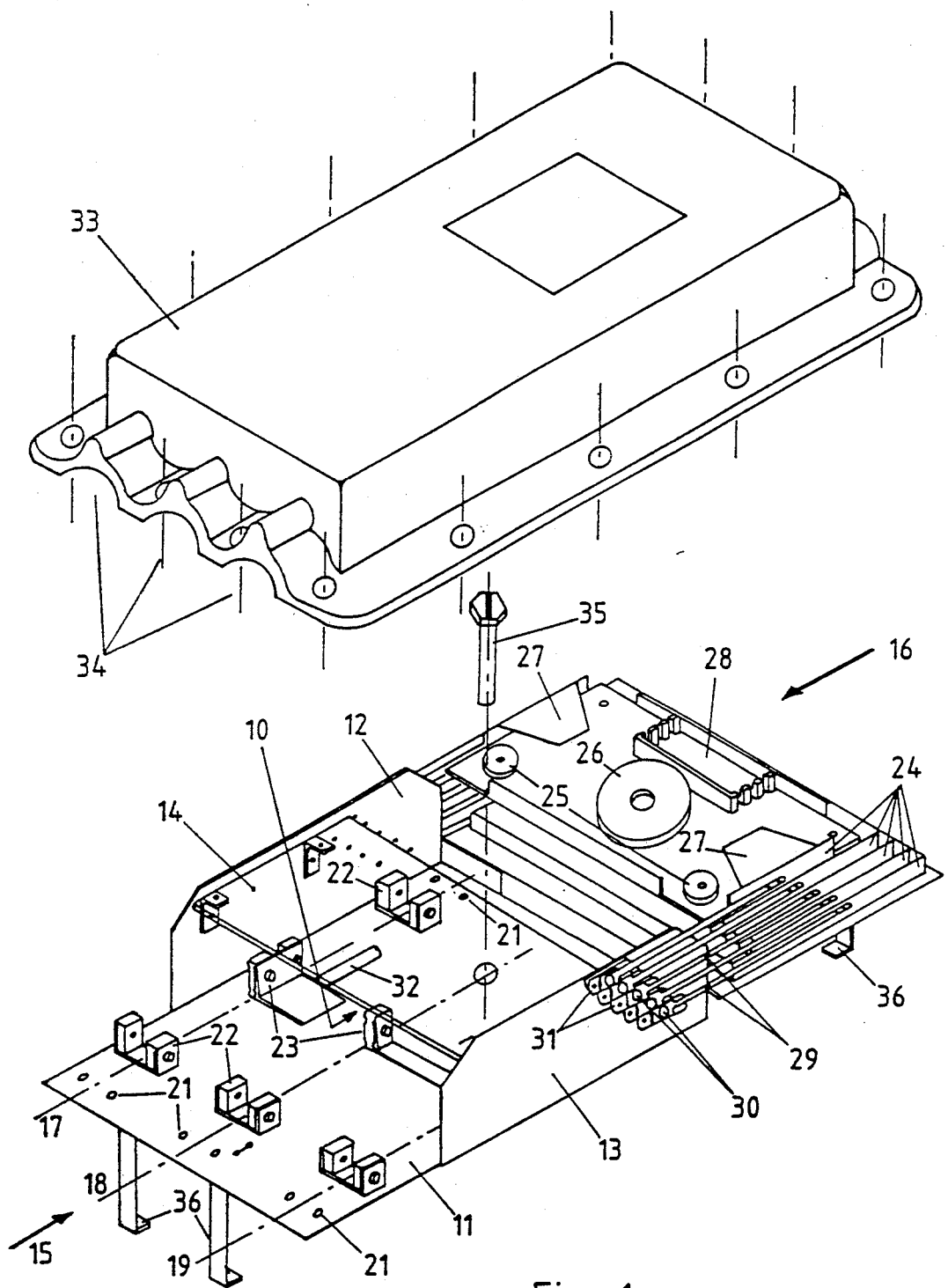
FIG. 1 shows an exploded view in perspective of an embodiment of the optical fiber cable joint closure box, according to the invention, including six symmetrical cable-reception housings distributed on two symmetrical access faces, with the representation of the upper half-shell of the housing box of the module.

As shown in FIG. 1, the exemplary embodiment of the joint closure module according to the invention includes a shielded space 10 for extension of the optical fiber transfer sections. In this example, this space 10 is demarcated by a supporting plate 11, and a pair of shielding lateral cheek plates 12, 13 surmounted by a movable cover 14 for partially closing the shielded space 10. In this space 10, the optical fibers may extend without particular protection and notably without tubing.

Figure 5:
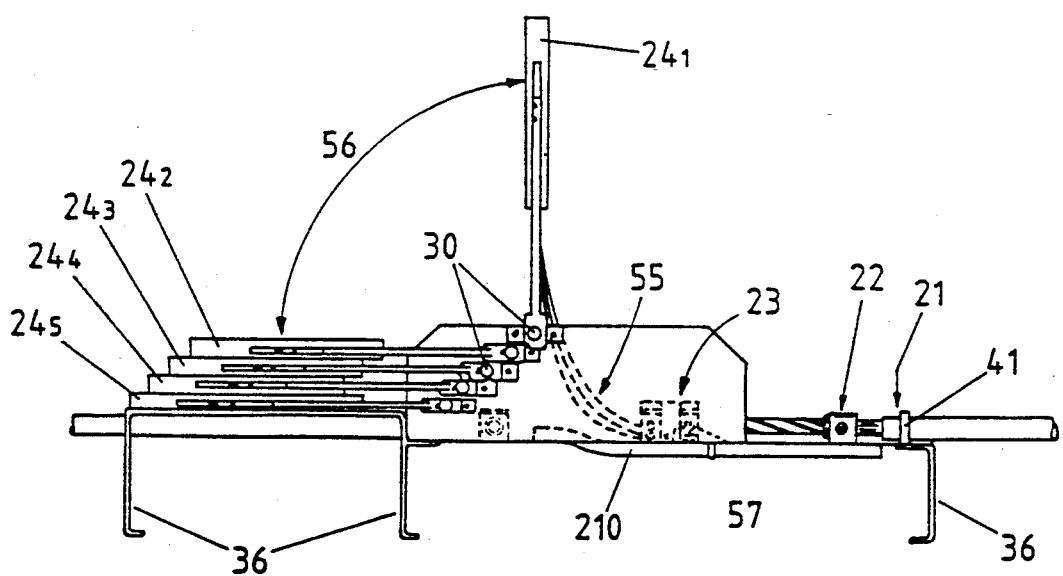
FIG. 5 is a side view of the module of FIG. 2, with a coiling and connection cartridge placed in a raised maintenance position.

It will be noted that this advantageous characteristic is due notably to the fact that the fiber transfer sections have access to the cartridges on the rotation pin 30 side of the cartridges. Advantageously, as shown in FIGS. 1 and 5, these pins extend horizontally, parallel to the surface of the supporting plate 11.

The module has a first access face 15, hereinafter called a "front face" for purposes of simplification, and a second access face 16, hereinafter called a "rear face".

On the plate 11, there are positioned three sets 17, 18, 19 of aligned and separate means for anchoring the constituent elements of the optical fiber cables. These anchoring means each respectively have holes 21 for fastening a collar to immobilize the external sheath of a cable, studs 22 for fixing, firstly, the grooved cores and, secondly, the reinforcing peripheral braids or rods and, finally, studs 23 for anchoring the central strength element.

On the rear access face 16 side, there are superimposed five optical fiber connection and coiling cartridges 24. These cartridges include studs 25, 26 for sending on and guiding the fiber reserve lengths, flaps 27 for the guidance and shielding of the coiled fibers as well as a tray 28 for housing the splice joints of the optical fibers.

The cartridges are hinged by means of arms 29 pivoting on rotation pins 30 located on the lateral cheek plates 12, 13. The rotation pins are, for example, mounted on the pin supports 31 riveted to the cheek plates 12, 13.

The axis 17 of alignment of the anchoring means of the cables has two symmetrical sets of holes 21 and studs 22, 23 so as to receive, on the same axis 17, two cables introduced respectively by the access face 15 and by the access face 16.

The fibers of the cable introduced by the access face 16 can plunge beneath the plate 11, through the crossing hole 32, so as to get coiled beneath the plate 11, on the access face 15 side, and then emerge by a second crossing hole (not shown) that orients the optical fibers towards the cartridges 24.

As suggested by the shape of the upper half-shell 33, shown in an exploded view in FIG. 1, the cables are introduced into the box through housings 34 receiving, for example, cable-holding collars, bonded into the housings 34. It is possible to envisage letting in one or more cables per collar (and hence per housing 34) as a function of the optical fiber capacity of the cables, on the one hand, and of the module, on the other hand. The sealing of the housings and of the collars for letting in the cables can be done, for example, by the injection of resin or other material into the collars.

The fixed joining of the module and the half-shells is done, for example, by means of screws 35 and fastening lugs 36.

FIG. 2 shows a top view of the module of FIG. 1, with four mounted optical fibers. The mounting configuration corresponds to the "1 towards 3" connection in which the optical fibers of the cable 1 are distributed and connected to certain of the optical fibers of the cables 2, 3 and 4.

This mounting configuration is shown in FIG. 3. It corresponds to a connection in line according to which the incoming cable 1 is introduced into the access face 16 opposite the access face 15 of the three outgoing cables 2, 3, 4. However, with the same module, it is possible to achieve different configurations, for example in a configuration in which the incoming and outgoing cables are introduced by one and the same access face. It is also possible to introduce several cables by one and the same access hole, for example three cables in a triangle. In this case, it is possible to arrange for the anchoring studs 21, 22, 23 to have superimposed fixing and anchoring elements, each corresponding to at least one of the cables introduced through the same access hole.

As shown in FIG. 2, each of the cables 1, 2, 3, 4 is fixed to the means for anchoring the cable elements in the following way:

the external sealing sheaths are fixed into the rings inserted into the holes $21_1$, $21_2$, $21_3$, $21_4$;

the grooved cores of the cables are guided between the straps of the studs $22_1$, $22_2$, $22_3$, $22_3$ while the braids or the rods are held laterally in said studs.

the central strength elements are anchored in studs $23_1$, $23_2$, $23_3$, $23_4$.

At the outgoing of the core, at the studs $22_1$, $22_2$, $22_3$, $22_4$, the optical fibers 202, 203, 204 of the cables 2, 3, 4 directly join up with the cartridges 24. By contrast, the fibers 201 coming from the cable 1 introduced by the rear access face 16 are guided beneath the supporting plate 10, in a tube 210 opening out on the upper face of the plate 11 through the crossing holes 32. Beneath the plate 11, the optical fibers have a radius of curvature compatible with the requirements of operation. The fibers 201 then join up with the cartridges 24. The guidance of the fibers 201 beneath the plate can also be done by sections of tubes or, again, by simple anchoring collars 211, 212, 213, with or without guidance tube 210.

The length of the transfer sections going through the protected space is, for example, ten centimeters, namely about two or three depths of the cartridge 24. This length corresponds to a zone for the spreading and mixing of the fibers, enabling the operational requirements for the radii of curvature of the fibers to be met.

Figure 4:
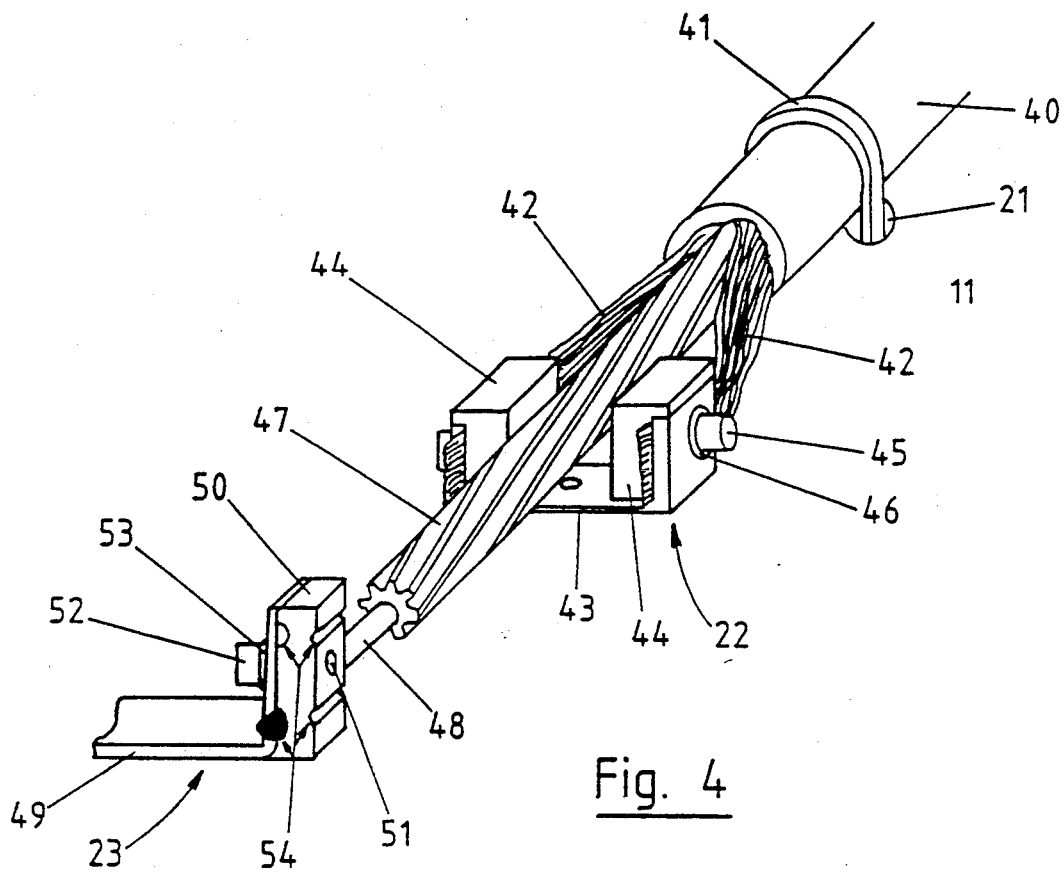
FIG. 4 shows a schematic view of the principle for anchoring a cable with grooved cores in a module according to the invention.

FIG. 4 is an enlarged view of the aligned means for anchoring a cable with grooved central core. Although this type of cable has been chosen in order to show the detailed embodiment of the invention, it is clear that the joint closure module is compatible with cables having fiber guidance tubes.

The sheath 40 of the cable is held in the collar 41 put into the holes 21 of the supporting plate 11. The cable-holding braids 42 are fixed by clamping, plane to plane, to the lateral ends of the stud 22. To this effect, the stud 22 is formed by a U-shaped strap 43, to the raised edges of which are added two symmetrical fastening cheek plates 44. The cheek plates 44 are provided with a tapped hole for the screwing in of a bolt 45 with a spring washer 46. The braids 42 are gripped between a fastening cheek plate 44 and the corresponding raised column of the strap 43. As the case may be, it is the reinforcement rods, which can be substituted for the braids in certain types of cables, that are immobilized between the parts 43 and 44.

The central interval of the strap 43 approximately localizes the zone of stopping the core 47 or, as the case may be, the stopping of the fiber guidance tubes.

Finally, the central strength element 48 is clamped into the stud 23. This stud is advantageously formed by a strap 49, the raised edge of which receives a movable, multiple-position, multiple-caliber shim 50. This shim 50 is provided with a tapped hole 51 working together with a bolt 52 and a brake washer 53 for the clamping on the strap 49. The multiple-position and multiple-caliber shim 50 is shown with four grooves 54 for receiving the central strength element 48. Each groove 54 corresponds to a different caliber (for example with diameters of 1.6 mm to 3.1 mm) compatible with different types of existing cables. If necessary, it is possible to provide for different types of multiple-caliber and multiple-position shims 54, so as to broaden the range of compatibility with existing or future cables. It is advantageous to be able to grip the central strength element 48 to a degree equal to or greater than 49 daN providing for a satisfactory anchoring of the cable in the joint closure module.

FIG. 5 is a view in profile illustrating the principle of mobility of the cartridges 24 of the module of the invention, making it possible to perfectly restrict and control the course of shift of the transfer sections of the optical fibers 55. The mobility of the cartridges $21_1$, $21_2$, $21_3$, $21_4$ and, possibly $21_5$ in a circular course or travel 56 around the rotation pins 30 is made necessary so as to release access to the lower cartridges.

However, the cartridge $24_5$ may be fixed to the supporting plate 11 since its mobility is not made necessary as it covers no other cartridge.

The fixing in a high position of maintenance (cartridge $24_1$ in FIG. 5) is achieved, for example, with temporary snap-on or equivalent means.

The optical fiber transfer sections 55 have a motion that is very restricted in the shielded extension space, notably for the following reasons:

the rotational and restricted nature of the course or travel 56 of the shift of the cartridges 24, the access to the transfer sections 55 in the cartridges 24 on the rotation pin side of the cartridges the arrangement of the rotation pins 30 of the cartridges, parallel to the surface of the supporting plate and to the coiling plane of the fibers in the cartridges;

the alignment of the means for anchoring the cable to the supporting plate, which communicates a direction of extension to the fibers in limiting their freedom of movement;

Thus, at no time is it possible to exceed the range of operating safety (radius of curvature, impossibility of jamming etc.). This principle further makes it possible to release a very clear working plane during assembly or maintenance (see FIG. 2) thus making the risks of poor assembly practically non-existent.

Two prototypes have been cabled according to the configuration of FIGS. 2 and 3. The assembling time and the cost of the parts have proved to be below that of the existing systems by more than 50%. The thermal and mechanical characteristics amply meet the specifications.

Advantageously, the joint closure module of the invention takes place in two stages:

a first stage for the preparation of the cables, the spreading of the transfer sections of the optical fibers and the passage of the reserve lengths into the coiling and connecting cartridges;

a second stage for the connection or joining proper of the fibers in the cartridges.

The first stage includes the steps for stripping the cables, fixing cables in the collars 21, 41, fixing peripheral braid or rod reinforcement pieces in the studs 22, stopping the grooved core or the tubes for guidance between the studs 22 and 23 and for anchoring the central strength element 48 in the stud 23. It also includes the steps for spreading the optical fibers of the cable, for extension of the transfer sections in the shielded space 10 and for coiling the ends of the transfer sections around the guidance studs 25, 26 of the cartridges 24. The reserve lengths are determined so as to enable several successive resplicing operations.

This first stage implies action by a first operator under conditions that are sometimes difficult owing to the fact that the cables and the fibers are coated with protective grease.

The second stage can be envisaged after the cleaning of the work plane, possibly during an operation by a second operator. This second stage has the steps of uncoiling the fibers coiled at the previous stage in the cartridges 24, this operation being performed cartridge by cartridge. After uncoiling, the joining or connection is done fiber by fiber by means of bonding, soldering, mechanical splicing or any other means. The invention accepts any kind of connection. When all the splices have been made, and housed in the racks 28, the fibers are finally coiled again in the cartridge 24 before the next cartridge is taken up. This second stage also corresponds to the various maintenance operations.

The capacity of the cartridges 24 may be, for example. 656 fibers, 10/10 fibers, 12/12 fibers or, again, any other capacity.

Several connection modules, such as those shown in FIGS. 1 and 2, may be superimposed or juxtaposed within one and the same box.

Furthermore, the capacity of a given module may be doubled by providing for a set of cartridges also on the access face 15 side.

In one and the same set, notably if this set is in a central position, the rotation pins of the cartridge can be positioned on at least two faces of said set. Thus it is possible for every second cartridge to pivot, in an interposed fashion, in a certain direction and for the other cartridges to pivot in the opposite direction. This enables the space occupied by the rotation means to be limited and provides simultaneous access to at least two cartridges in maintenance position.

The layout, shape and capacity of the cartridges and of the joint closure module as well as the number of cartridges and sets of cartridges can be modified without going beyond the scope of the invention.

What is claimed is:

1. A joint closure module for optical fiber cables, wherein each cable is notably of the type including, inserted in an external sealing sheath, a plurality of optical fibers held around a central strength element by grooved core or tube and peripheral reinforcement braid supports or rod supports, said module receiving the ends of the cables to be connected to at least one of two opposite access faces, and providing shelter to means for fastening the cable ends, means for spreading the fibers contained in the cables, and cartridges housing reserve coils of fibers and the connecting splices of said connected fibers, this module having a supporting plate demarcating above at least one portion of its surface, a shielded space of extension of the transfer sections of the fibers, said supporting plate including, firstly, a set of aligned and separate means for anchoring the external sheath, the peripheral reinforcements and the central strength element, respectively, of each cable and, secondly, at least one fiber connection (or joining) and coiling cartridge, with guided hinging arranged so as to restrict the transfer length and course of shift of said transfer sections during the guided shifting of said hinged cartridge.

2. A module according to claim 1, comprising at least two adjacent cable entry holes arranged in a plane parallel to the supporting plate of the module, the sets of aligned means for anchoring the cable elements to the supporting plate extending parallel to said supporting plate, substantially in the alignment of said entry holes.

3. A module according to claim 1, wherein the anchoring means of each cable have a spacing between them such that the fibers coming from a cable received on at least one of said entry faces of the module extend directly without coiling, in said shielded space, up to the corresponding connection and coiling cartridge.

4. A module according to claim 1, wherein the hinging means of each fiber coiling and connection cartridge are formed so as to enable a shifting of the cartridge between a first functional position of normal storage of the cartridge in the module and a second maintenance position, with the shifting of the cartridge between the first position and the second position taking place along a single guided course.

5. A module according to claim 4, wherein said single guided course of each cartridge essentially describes a curve of rotation, and wherein the fiber entries in the coiling cartridges are located on the rotation pin side of the cartridge.

6. A module according to claim 5, wherein the course of shift of the cartridge is substantially circular around a rotation pin, substantially parallel to the plane of said supporting plate, said cartridge extending in a plane substantially parallel to the supporting plate of the module in said first position of storage.

7. A module according to claim 4, wherein said supporting plate has at least one set of at least two coiling and connection cartridges, and wherein the cartridges of one and the same set extend in an essentially superimposed way, parallel to the supporting plate, in the first storage position, and are each capable of being shifted towards the second maintenance position so as to clear the access to the lower cartridge of the superimposed assembly.

8. A module according to claim 7, having at least one fixed cartridge.

9. A module according to claim 1, wherein said supporting plate includes substantially vertical lateral shielding cheek plates providing a heightwise demarcation of said shielded space for extension of the fiber transfer sections.

10. A module according to claim 9, wherein said cheek plates are surmounted by a movable hood for closing said shielded space for extension of the fiber transfer sections.

11. A module according to claim 10, wherein said fiber transfer sections between said means for anchoring the elements of the cable and said cartridge entries extend essentially in a straight line in a space demarcated by the supporting plate and the lateral shielding cheek plates.

12. A module according to claim 1, including a space for coiling the optical fibers on that side of the surface of the supporting plate which is opposite the surface for anchoring the elements of the cables.

13. A module according to claim 12, including perforations crossing the fibers from the anchoring surface towards the coiling surface of the supporting plate, said crossing perforations being prepared in such a way as to enable the coiling of the fibers on that side of the access face of the module which is opposite the face for receiving the end of the optical cable corresponding to said fibers.

14. A module according to claim 1, wherein means for receiving the cartridges are laid out on the surface of the supporting plate, opposite the surface for anchoring the elements of the cables.

15. A module according to claim 1, wherein at least some of said means for anchoring the cable elements are formed by studs fixedly joined to the plate, provided with movable means for fixing said elements of the cable by screwing in or other means.

16. A module according to claim 15, wherein the anchoring stud of the central strength element of the cable includes a multiple-position and multiple-calibre for the reception of said central strength element.

17. A module according to claim 6, wherein the means for hinging the cartridge are formed by at least one rocking lever fixedly joined to said cartridge, and mounted rotationally on said supporting plate, said lever cooperating with the temporary fixing means by the snapping in of the cartridge in maintenance position.

18. A joint closure box for optical fiber cables comprising at least one joint closure module according to any one of the claims 1 to 17, inserted between two sealing half-shells.

* * * * *